E. S. LOOZE.
HOSE CONNECTOR.
APPLICATION FILED FEB. 3, 1917.

1,253,065.

Patented Jan. 8, 1918.

Inventor
Ed. S. Looze.

By Talbert & Parker
Attorneys

UNITED STATES PATENT OFFICE.

EDWARD S. LOOZE, OF FLINT, MICHIGAN.

HOSE-CONNECTOR.

1,253,065.
Specification of Letters Patent.
Patented Jan. 8, 1918.

Application filed February 3, 1917. Serial No. 146,334.

*To all whom it may concern:*

Be it known that I, EDWARD S. LOOZE, a citizen of the United States, residing at Flint, in the county of Genesee and State of Michigan, have invented certain useful Improvements in Hose-Connectors, of which the following is a specification, reference being had therein to the accompanying drawing.

The invention relates to a hose connector, and more particularly to the class of quick detachable hose couplings.

The primary object of the invention is the provision of a coupling of this character wherein the male and female members are of novel form to permit the detachable fastening of the same together with despatch and without possibility of leakage at the joint.

Another object of the invention is the provision of a coupling of this character wherein the interfitting of the members thereof with accuracy is assured and the secure locking of the same together.

A further object of the invention is the provision of a coupling of this character which is simple in construction, readily and easily connected and separated, reliable and efficient in its purpose and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings.

Similar reference characters indicate corresponding parts throughout the several views of the drawing.

Figure 1:
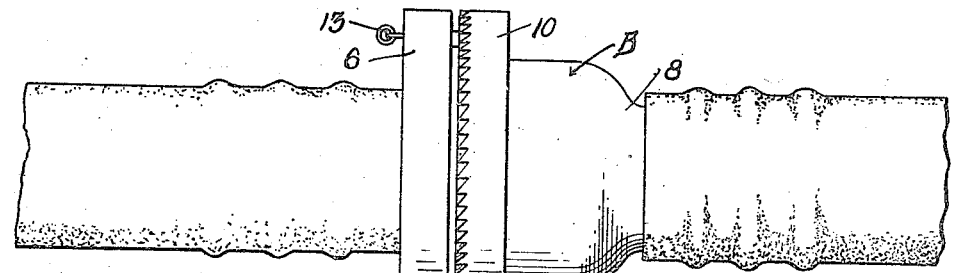
Figure 1 is an elevation of a coupler constructed in accordance with the invention.
Figure 2:
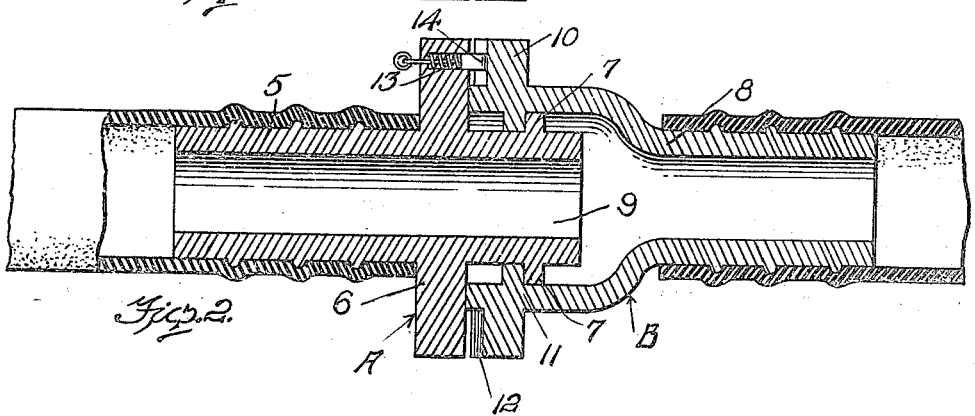
Fig. 2 is a vertical longitudinal sectional view thereof.
Figures 3, 4:
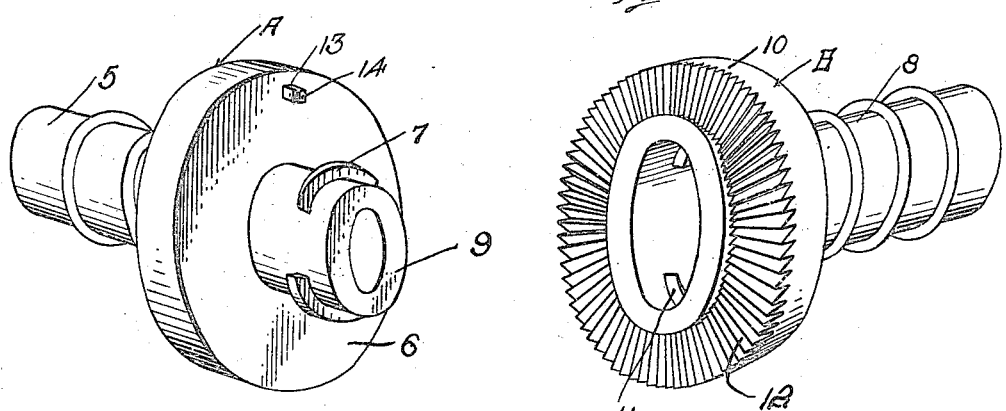
Fig. 3 is a perspective view of the male member.
Fig. 4 is a perspective view of the female member.

Referring to the drawing in detail, A designates generally the male member and B the female member of the coupling, each being described in detail hereinafter.

The male member comprises a tubular section 5 which is of uniform diameter in cross section throughout its length, and on one end is mounted a stretch of the hose, while spaced from the opposite end of said section is an annular head 6 exteriorly of the same, and spaced from this head are diametrically opposed web shaped lugs or cams 7 which are formed on the section at the outer face thereof for locking engagement with the female member, hereinafter fully described.

The female member comprises a tubular section 8, which is of uniform but slightly greater cross sectional diameter than the section 5 for the telescoping of the connecting end 9 of the latter into said section 8 in uniting the male and female members. On the end opposite the connecting end of said tubular section 8 is adapted to be mounted another stretch of the hose. The section 8 is formed with an annular head 10, exteriorly thereof, at its connecting end, which heads of both members coact with each other when the male and female members are connected together to form a fluid-tight joint therebetween.

The connecting end of the section 8 is formed with internal web shaped lugs or cams 11 diametrically opposite each other and reversely set with respect to the lugs or cams 7 to coöperate therewith for the fastening of the members together, and these lugs or cams when acting with each other serve to tightly draw the connecting end 9 of the male member within the connecting end of the female member when one or the other of the members are turned a slight distance or approximately a quarter turn, while turning in the reverse direction permits the uncoupling or disconnecting of the members.

The outer face of the head 10 is formed with radially disposed ratchet teeth 12, while mounted in the head 6 is a spring-held ratchet 13 formed with a beveled end 14 adapted to ridge over the teeth on movement of the male member in one direction, but locks with the teeth when said member is moved in the reverse direction, and this latch securely fastens the male and female members together to avoid accidental separation thereof.

From the foregoing description, taken in connection with the accompanying drawing, the construction and use of the herein described hose connector is readily apparent and, therefore, a more extended explanation has been omitted.

Having thus described my invention, I claim:

In combination a pair of coupling members, each of said members including a tubular section receiving the end of a hose, the tubular section of one coupling member being of a uniform diameter, an annular head formed upon the last named tubular section near its outer end, two cam lugs formed at diametrically opposite points of said last named tubular section, the other tubular section being provided with an enlargement in which is received the first named tubular section in concentrically spaced relation, an annular head formed upon the enlargement of the second tubular section in back of the outer edge thereof so that said outer edge may be pressed against the first named annular head, said enlargement being formed internally with diametrically opposite cam lugs adapted to engage sidewise against the first named cam lugs to cause said enlargement to engage the said first named annular head, a circumferentially extending series of jagged teeth formed upon the second named annular head, and a retractible locking bolt mounted in the first named annular head and engaging said teeth to hold said cam lugs in engagement.

In testimony whereof I affix my signature.

EDWARD S. LOOZE.

Copies of this patent may be obtained for five cents each, by addressing the "Commissioner of Patents, Washington, D. C."